(No Model.)
T. B. GOLDSMITH.
COTTON CHOPPER AND CULTIVATOR.
No. 330,314. Patented Nov. 10, 1885.
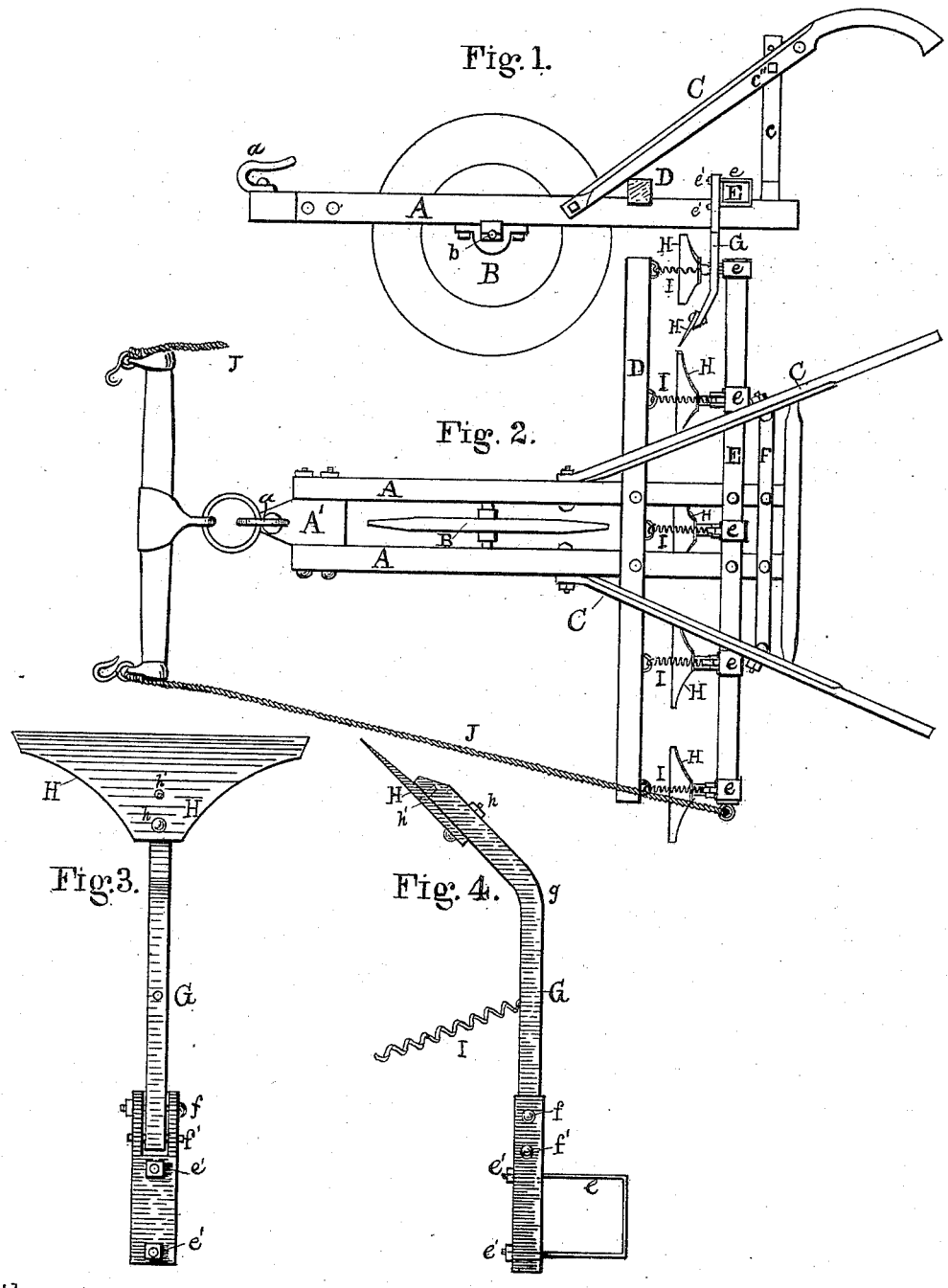

UNITED STATES PATENT OFFICE.

THOMAS B. GOLDSMITH, OF SIMPSONVILLE, SOUTH CAROLINA.

COTTON CHOPPER AND CULTIVATOR.

SPECIFICATION forming part of Letters Patent No. 330,314, dated November 10, 1885.

Application filed July 18, 1885. Serial No. 171,947. (No model.)

*To all whom it may concern:*

Be it known that I, THOMAS B. GOLDSMITH, a citizen of the United States, residing at Simpsonville, in the county of Greenville and State of South Carolina, have invented a new and useful Improvement in Cotton Choppers and Cultivators, of which the following is a specification, reference being had to the accompanying drawings.

This invention relates to improvements in cotton choppers and cultivators combined, which will be hereinafter more particularly described, and pointed out in the claim.

In the accompanying drawings, forming a part of this specification, Figure 1 is a side elevation of the chopper. Fig. 2 is a plan view of Fig. 1. Fig. 3 is a view of the front of one of the hoes and choppers and the standard, and Fig. 4 is an edge view of Fig. 3. These two figures are reversed from natural position.

A A represent the two beams of wood, which may be about forty inches long and of such cross-section dimensions as to be substantial and sustain all the other parts.

B is a wheel, made as shown in the drawings, its axle being properly supported in suitable boxes, $b$, under the beams A A. At the front end of beams A A, and between them, is bolted the block A', to which is attached the draft-hook $a$. The handles C C are fastened by bolts $c\ c$ to the outside of the frames A A, and are supported on standards $c'\ c'$ by bolts $c''\ c''$. In the standards $c'\ c'$ are several holes for bolts $c''\ c''$, in any of which the bolts may be placed to give the proper rake of the handles. Across the rear ends of beams A A are secured by bolts the front bar, D, and the chopper or hoe bar E. F is the base or sill of the supporting-standards $c\ c$. To the chopper or hoe beam E are attached any number of hoops or bands, $e\ e$. The drawings (Fig. 2) show five; but any number may be used. These can be adjusted to any distance apart by means of the screw-bolts $e'\ e'$. The standards G are made with a pivot-joint at $f$. Near pivot $f$ is a hole, $f'$, through which a wooden pin can be inserted, the object of which will be hereinafter explained. At $g$ the hoe or chopper shank is bent, as shown in Fig. 4.

H is the chopper or hoe, which is secured to the shank by a screw-bolt, $h$, and a pin, $h'$, projecting from the shank G into a hole in the chopper or hoe. It will readily be seen that the chopper or blade H may be of any shape or size. In place of the chopper for weeding out plants cultivator-blades may be used. At a convenient distance above the choppers, on the vertical part of the shank G, the end of a strong spiral spring, I, is secured, the other end of which spring is to be secured to the front bar, D, which I call the "spring-beam," as seen in Figs. 1 and 2. The object of these springs is to keep the choppers in position to cut through the plants; but should any more forcible obstacle be encountered the blade will give way and pass over said obstacle, and so soon as passed the spring will draw the cutter back to its normal position for work. Should any spring become weakened while at work, a small wooden pin can be inserted in the hole $f'$, so that the chopper will do its work, and if any obstruction should intervene the stick would break and permit the shank to turn, as in case of the spring, when another wooden pin can be inserted.

The wheel B is made thin on the periphery, as shown in Fig. 2, to cut its way through the cotton-bed, so as to level the frame and give steadiness to it laterally.

The object of this machine is to run crosswise of the cotton-beds, and, by spacing the hoes or cutters, adjusting the caps on the cutter or hoe beam, to cut the cotton-plants out and leave a stand or in bunches. Afterward the same frame is to be used—the long choppers to be replaced by shorter blades in the cultivation in the same direction.

It will be observed that this machine is not to run, as usual, along parallel with the cotton-beds, but transversely thereto.

To strengthen the ends of the chopper or hoe beam, I attach chains or strong cords J J to the two ends of the whiffletree-bar and connect them to the ends of the chopper-beam, as shown in Fig. 2.

I claim—

The combination of the double beams A A, wheel B, having a thin edge, the spring-beam D, springs I I I, the jointed hoe or chopper shanks G, the hoe-beam E, and the chains or cords J J, connected thereto and to the whiffletree bar, all substantially as and for the purpose described.

In testimony that I claim the foregoing as my own I hereunto affix my signature in presence of two witnesses.

THOMAS B. GOLDSMITH.

Witnesses:
P. H. REILLY,
J. B. MILLER.